J. M. MACK.
GRIP TREAD FOR VEHICLE TIRES.
APPLICATION FILED NOV. 18, 1908.
1,128,340.
Patented Feb. 16, 1915.
3 SHEETS—SHEET 1.
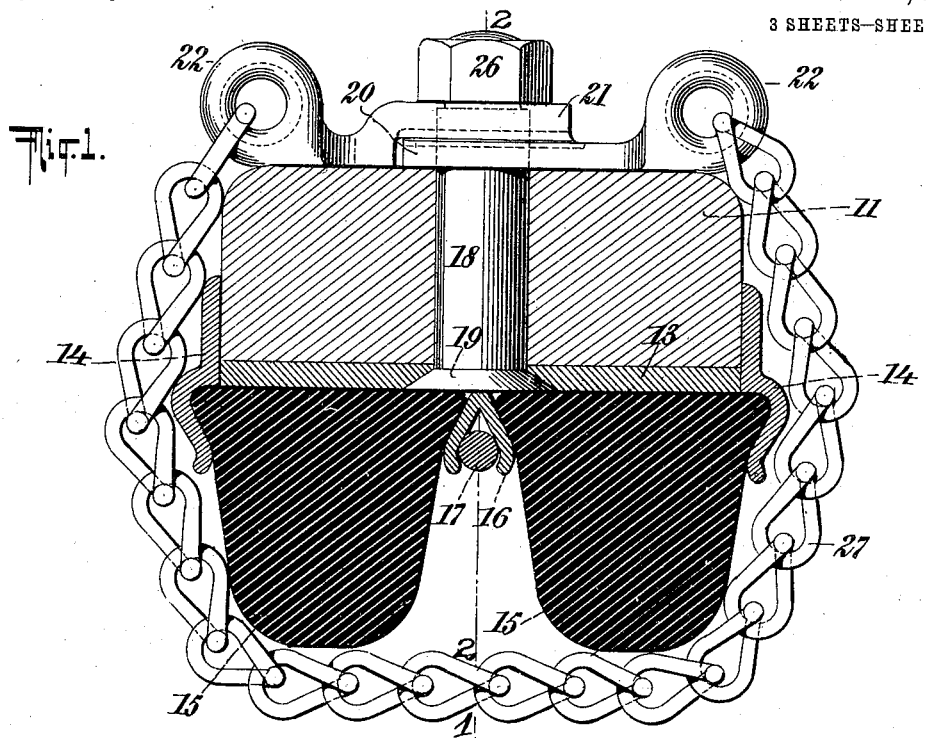
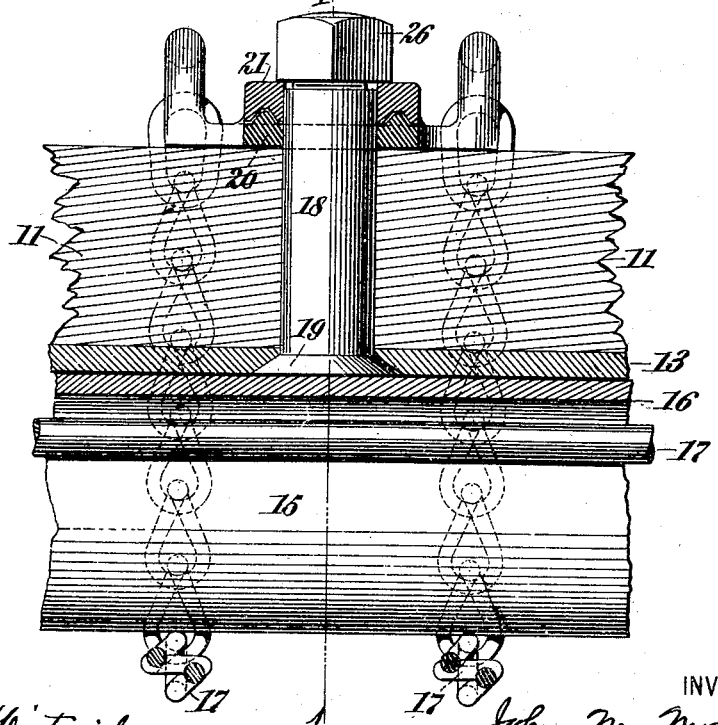
WITNESSES:
Edwin H. Dietrich.
George Bambay.
INVENTOR
John M. Mack
BY
Whaley & Hashanck
his ATTORNEYS J. M. MACK.
GRIP TREAD FOR VEHICLE TIRES.
APPLICATION FILED NOV. 18, 1908.
1,128,340.
Patented Feb. 16, 1915.
3 SHEETS—SHEET 2.
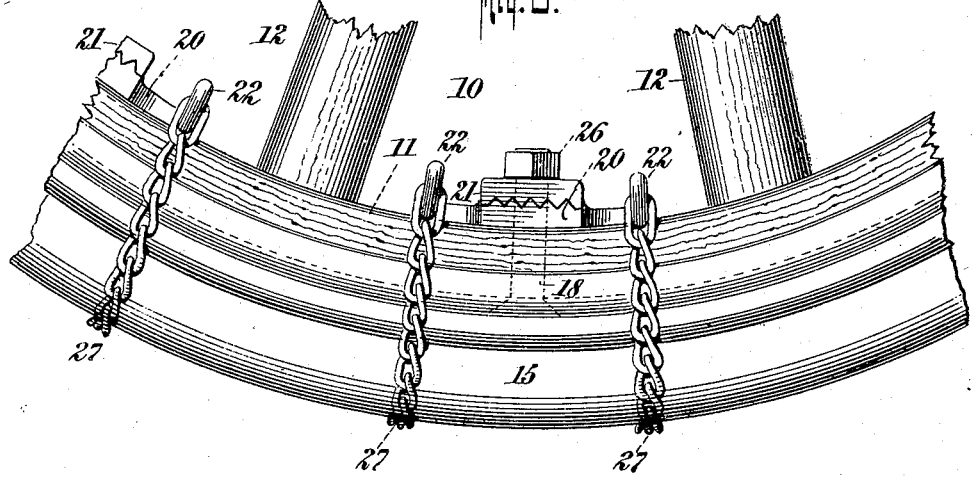
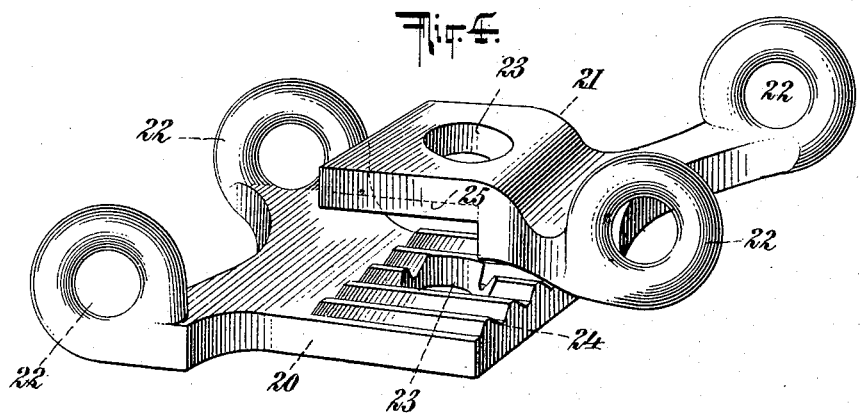
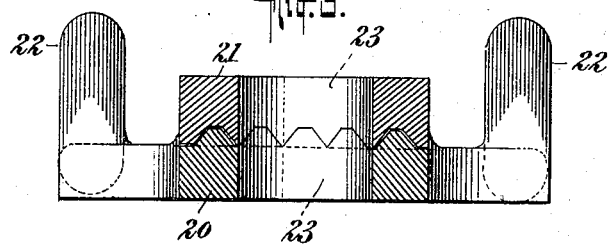
WITNESSES:
INVENTOR
John M. Mack
BY
Whaley & Hasbrouck
his ATTORNEYS J. M. MACK.
GRIP TREAD FOR VEHICLE TIRES.
APPLICATION FILED NOV. 18, 1908.
1,128,340.
Patented Feb. 16, 1915.
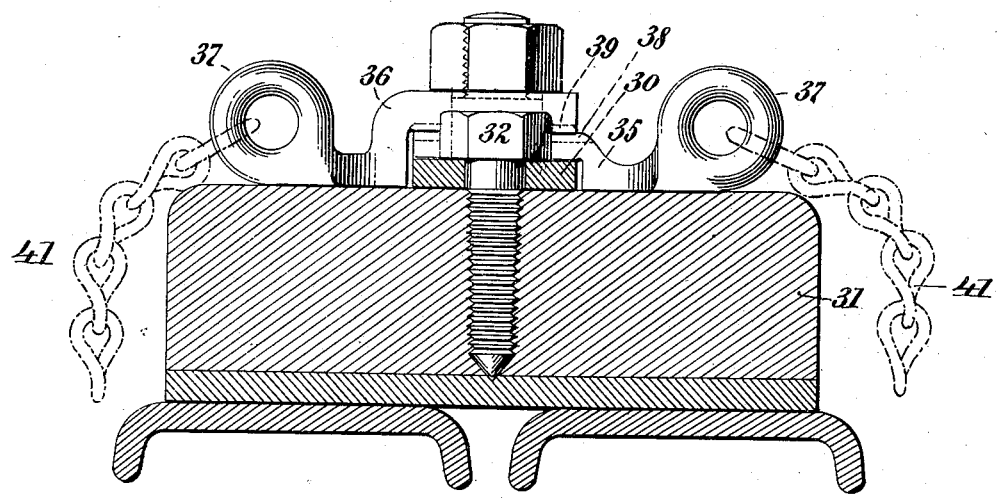
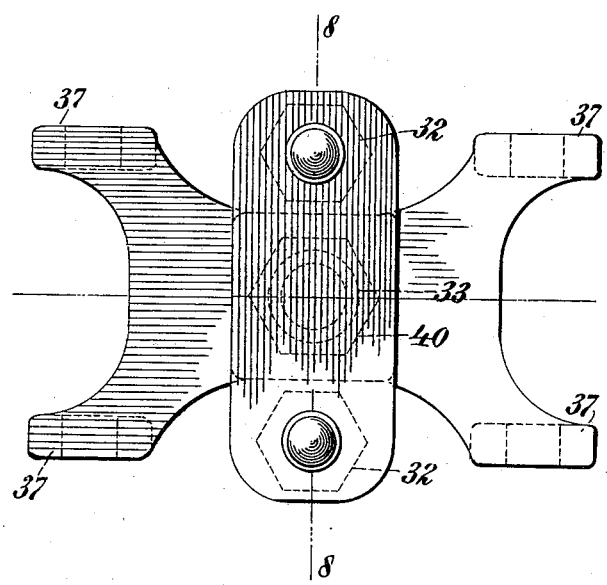
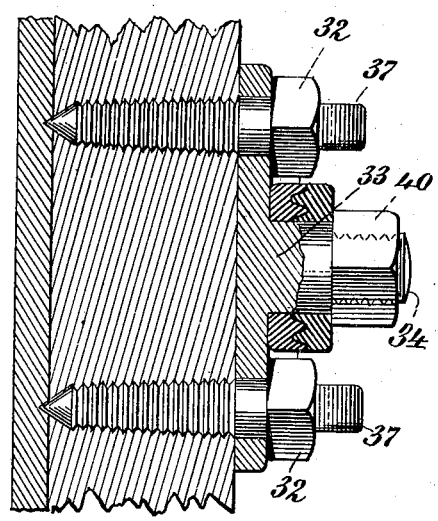
WITNESSES:
INVENTOR
John M. Mack
BY
ATTORNEYS

UNITED STATES PATENT OFFICE.

JOHN M. MACK, OF ALLENTOWN, PENNSYLVANIA, ASSIGNOR TO INTERNATIONAL MOTOR COMPANY, OF WILMINGTON, DELAWARE, A CORPORATION OF DELAWARE.

GRIP-TREAD FOR VEHICLE-TIRES.

1,128,340.  Specification of Letters Patent.  Patented Feb. 16, 1915.

Application filed November 18, 1908. Serial No. 463,260.

*To all whom it may concern:*

Be it known that I, JOHN M. MACK, a citizen of the United States, residing at Allentown, Lehigh county, in the State of Pennsylvania, have invented certain new and useful Improvements in Grip-Treads for Vehicle-Tires, of which the following is a full, clear, and exact specification.

My invention relates to improvements in means for preventing the skidding or slipping of vehicle wheels, and for increasing the tractive power thereof, and the same has for its object more particularly to provide a simple, efficient and reliable device which may be readily attached to or removed from the wheel.

Further, said invention has for its object to provide a device which is more particularly adapted for use in connection with heavy commercial vehicles provided with tires of the twin type variety.

To the attainment of the aforesaid objects and ends, my invention consists in the novel details of construction, and in the combination, connection and arrangement of parts hereinafter more fully described, and then pointed out in the claims.

In the accompanying drawings forming part of this specification, wherein like numerals of reference indicate like parts, Figure 1 is a transverse section taken on the line 1—1 of Fig. 2, showing a form of vehicle wheel provided with twin tires, and one form of grip tread constructed according to and embodying my invention applied thereto; Fig. 2 is a longitudinal section of the same taken on the line 2—2 of Fig. 1; Fig. 3 is a detail side view showing a portion of a vehicle wheel and tire with my invention applied thereto; Fig. 4 is a detail perspective view showing the clamping device for securing the device in position upon a vehicle wheel; Fig. 5 is a longitudinal sectional view showing the clamping means with the parts fitted together; Fig. 6 is a transverse sectional view showing a modified form of securing or attaching means; Fig. 7 is a bottom view of the securing or attaching means detached from a wheel rim, and Fig. 8 is a longitudinal section taken on the line 8—8 of Fig. 7.

In said drawings 10 designates a vehicle wheel comprising a wooden felly 11 and spokes 12 of usual construction. Upon the outer side of the felly 11 is secured an annular metal plate 13 and along the opposite edges of said felly 11 are secured annular flanges 14, 14 having their edges projecting beyond the opposite edges of said annular plate 13.

15, 15 denote solid rubber tire portions which are maintained in position upon the annular plate 13 and against the inner sides of the annular flanges 14 14 by means of an intermediate annular member 16 and a ring 17. Midway between the spokes 12 12 are arranged bolts 18 18 which extend inwardly through the felly 11 and the annular plate 13 and have their heads 19 19 disposed in countersunk recesses provided upon the outer surface of the annular plate 13. The inner end of said bolts extend above the inner edge of the felly and upon said inner projecting ends of said bolts 18 18 are disposed plates 20, 21 provided at their outer edges with eyes 22 22. Both of said plates are provided with centrally located apertures 23 23 to receive the projecting end of the bolt 18. The lower of said plates is provided at the end opposite to the eyes 22 22 with a series of longitudinal ribs or projections 24 24 which extend upwardly from the upper surface of said plate, while the underside of the upper plate 21 is partly cut away and provided with a series of depressed longitudinal grooves 25 25 which register with the projections 24 24 on the lower plate 20 when said plates are adjusted in position one upon the other and upon the bolt 18. 26 denotes a nut disposed upon the threaded projecting end of the bolt 18 whereby to secure said plates 20 and 21 rigidly in position upon the felly of the wheel with the eyes 22 22 thereon arranged adjacent to the opposite edges of the felly, and 27 27 denote transverse gripping members or chains each secured at one end to one of the eyes 22 22 of the plate 20 and its other end extending over and bearing against the tires 15 15 and secured within one of the eyes 22 22 of the plate 23.

It will of course be understood that in actual use the wheel is to be provided between each of its spokes with one or more bolts 18 18 as the dimensions of the wheel require, and clamping plates 20, 21 having chain portions 27 27 secured thereto, so that the space between the chain portions 27 27 of each clamping device or section shall be about equally distanced from each other, and the chains of the adjoining clamping device or sections at either side thereof.

The construction above described is particularly designed for use in connection with wheels intended to be provided with anti-skidding devices constructed according to this invention, and at Figs. 6, 7, and 8 I have shown a modification which is intended to be applied to vehicle wheels without in any way changing the construction thereof, or necessitating the removal of the tires and securing members therefor from the wheel. In the construction as illustrated at said figures the clamping device comprises a transverse plate 30 adapted to be secured in position upon the inner surface of the felly 31 by means of screws 32 32 and intermediate said screws 32 32 said transverse plate 30 is provided with a short inwardly projecting threaded stud or bolt 33 having a reduced threaded portion or end 34. 35 36 denote clamping devices each provided at its outer projecting ends with a pair of eyes 37 37. The lower of said plates 35 36 has its underside cut away or recessed at its inner end so that the underside of its outer projecting portion shall rest directly upon the inner surface of the felly, and the underside of its inner recessed portion rest directly upon the transverse plate 30, and upon the upper surface of said lower plate 31 is provided a series of projecting ribs or corrugations 38 38. The upper clamping plate 36 is also recessed upon the underside of its corresponding end, but to a greater extent than the plate 35, so that its outer projecting portion shall rest upon the inner surface of the felly 31, while its inner portion which is provided with a series of longitudinal grooves or recesses 39 39 shall register with the projections or corrugations 38 upon the upper surface of the lower plate when said plates are brought into position. The inner overlapping ends of the plates 35 and 36 are provided with registering apertures adapted to receive the threaded stud or bolt 33 of the transverse plate and be secured in position thereon by means of a nut 40 working upon the threaded end or portion 34 of said stud or boss 33, and 41 41 denote chains secured at their opposite ends to the eyes 37 37 of the plates 35 and 36 and embracing the tire or tires of the wheel.

Having thus described my invention, what I claim and desire to secure by Letters Patent is:

1. An apparatus of the character described, comprising a stud adapted for securement to a wheel rim intermediate the spokes thereof, a plurality of flat attaching plates provided with registering openings adapted to receive said stud, means for holding said plates against lateral movement relative to each other, gripping means secured to said attaching plates, and means for securing said attaching plates together and to said stud, substantially as specified.

2. An apparatus of the character described, comprising a vertical support adapted for securement to a wheel rim intermediate the spokes thereof, a pair of flat attaching plates provided with registering apertures adapted to be engaged by said vertical support, one of said plates being provided upon its upper side with a series of parallel longitudinal ribs, and the other of said plates provided upon its under side with a series of parallel longitudinal grooves adapted to receive the ribs on said first-named plate, gripping means secured to said attaching plates, and means for securing said attaching plates together and in position upon said vertical support, substantially as specified.

3. An apparatus of the character described, comprising a bolt adapted for securement to a vehicle wheel, a plurality of flat attaching plates adapted to be engaged by said bolt, a series of longitudinal grooves provided in the end of one of said plates, a series of longitudinal projections provided upon the other of said plates and intermeshing with the grooves of said first-named plate, eyes provided at the outer ends of said plates, a plurality of chains secured at their ends to the eyes provided at the ends of said attaching plates, and a nut for securing said attaching plates together and in position upon said bolt, substantially as specified.

Signed at Allentown, in the county of Lehigh and State of Pennsylvania, this 14th day of November, nineteen hundred and eight.

JOHN M. MACK.

Witnesses:
H. A. SCHULAR,
CHAS. S. DILCHER.